July 5, 1927.
A. CERVI
1,635,113
PROCESS OF AND APPARATUS FOR DISSOLVING RADIUM EMANATION IN FLUIDS
Filed March 16, 1926   2 Sheets-Sheet 1
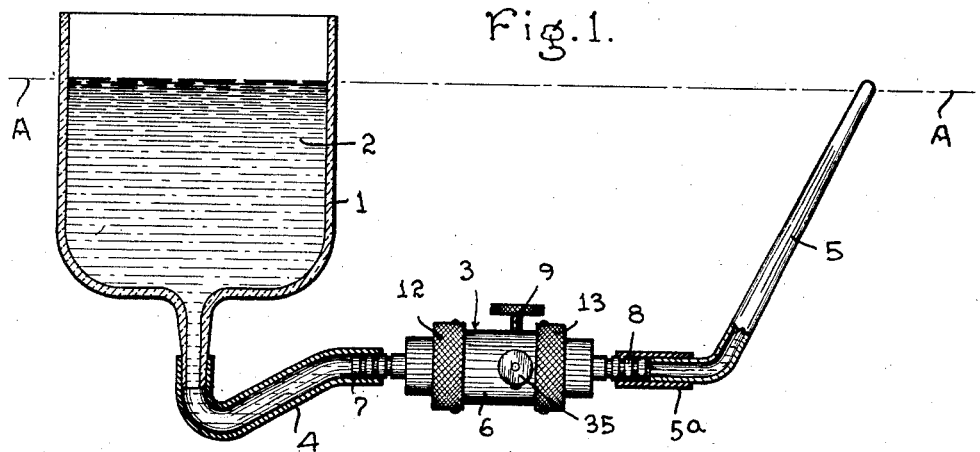
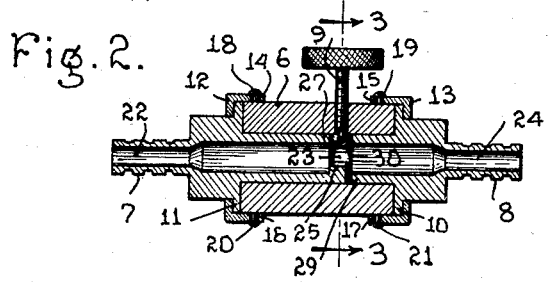
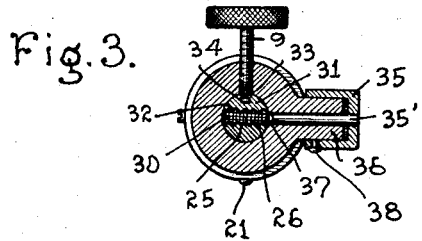
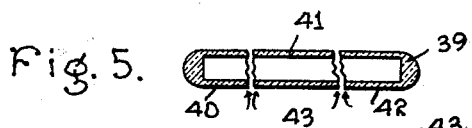
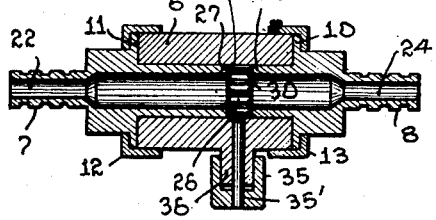
INVENTOR,
Armando Cervi
BY
ATTORNEY

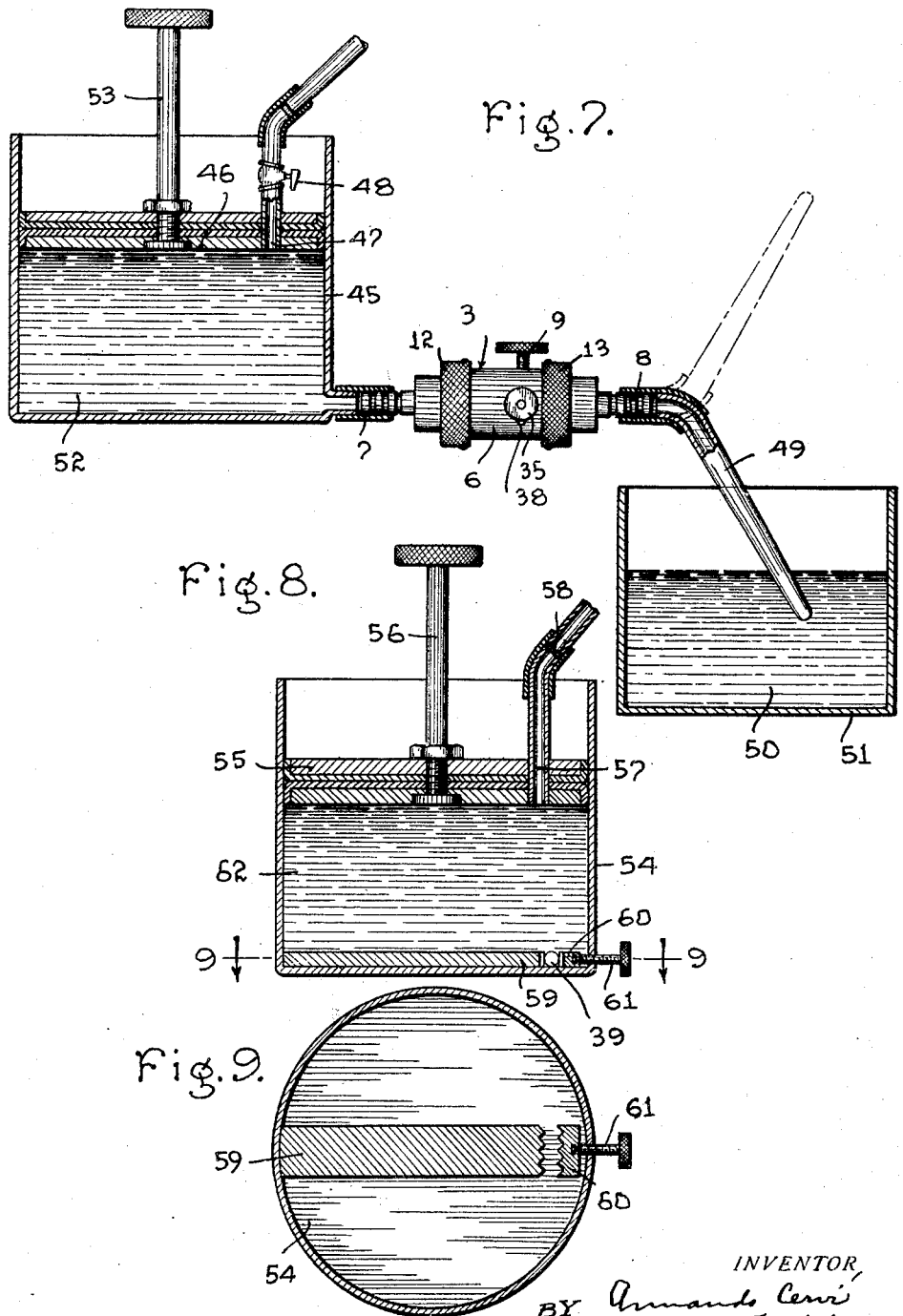

Patented July 5, 1927.

1,635,113

UNITED STATES PATENT OFFICE.

ARMANDO CERVI, OF NEW YORK, N. Y., ASSIGNOR TO THE RADIUM EMANATION CORPORATION, OF NEW YORK, N. Y., A CORPORATION OF DELAWARE.

PROCESS OF AND APPARATUS FOR DISSOLVING RADIUM EMANATION IN FLUIDS.

Application filed March 16, 1926. Serial No. 95,119.

My invention relates to a process of and an apparatus for dissolving radium emanation in fluids, using as a source of radium emanation, fragile capillary tubes such as glass tubes, containing radium emanation. According to my invention, an activated liquid or solution is made available for internal use without allowing the radium emanation to escape from solution and this is accomplished by preventing the activated liquid or solution from coming in contact with the atmosphere.

The fragile seeds referred to contain radium emanation in equilibrium with the products of decomposition of radium emanation. The radium emanation itself is a decay product of radium; it is a gas and it collects above a solution of radium for example radium bromide. When using a radium bromide solution, the impure emanation may be purified by substantially completely removing the impurities which in the major portion comprise, hydrogen chloride, hydrogen bromide, water vapor, hydrogen, and hydrogen peroxid. Any suitable purification mediums may be employed but I prefer to treat the impure emanation as follows: The gas is passed through potassium hydroxid, then through a heated cupric and cuprous oxid coil and finally through phosphorous pentoxid.

Radium emanation is a gas and is the first disintegration product of radium. It occurs in nature as a gas or in solution in waters that have passed through uranium and radium deposits. The spring waters containing radium emanation in solution, such as those of Carlsbad, Joachimstal, Saratoga, etc., have been found beneficial when taken internally.

Heretofore, to obtain by artificial means, a solution of radium emanation in water, the procedure has been as follows: Air was bubbled through an acid aqueous solution of radium bromide and radium chloride. The resulting mixture of air and radium emanation was then passed through an alkaline bath and the purified gaseous mixture was bubbled through water several times. The water absorbed the radium emanation and was then ready for drinking purposes. The absorption of the radium emanation occurs in a bottle having an open top.

The above procedure is objectionable as will appear from the following:

(1) The solution contains amounts of radium varying from ½ mg. to 2 mg., the maximum amount of radium emanation being given off by the radium solution each day being, at best, 0.33 millicuries of emanation. Larger amounts are only possible by having more radium in solution. This is impractical because of the high price of radium.

(2) Since the amount of radium emanation given off each day is very small, the efficiency of the process is very much impaired because the emanation is passed through two different solutions.

(3) To give high dosages, the amount of radium in solution must be increased, which is impractical as above noted.

(4) The efficiency of the absorption of radium emanation by water is very much impaired because of the amount of air, which is always mixed with the emanation. Although the absorption of the radium emanation is not affected by the partial pressure of the gases mixed with it, as proved by Boyle, the volume of air is such that a large amount of radium emanation will remain undissolved, as proven below.

(5) The bottle containing the radium emanation solution has an open top so that the emanation easily escapes from solution, as proven below.

The statements of paragraphs 4 and 5 depend for their accuracy on the following:

The coefficient of absorption of radium emanation in water is 0.25. It is defined as follows:—If a certain mixture of air and radium emanation of volume $V_1$ is enclosed in a closed container of volume $V$ partially filled with water of volume $V_2$ so that $V_1 + V_2 = V$; and the container is shaken so as to allow the emanation to come in intimate contact with the water, then if $E_1 =$ the amount of radium emanation in gas and $E_2 =$ the amount of radium emanation in the liquid, the radium emanation will be absorbed by the water until equilibrium is reached between the partial pressure of the emanation in the gas and pressure of the emanation in the liquid. At any time $\frac{E_2}{V_2}$ = the concentration of radium emanation in liquid $\frac{E_1}{V_1}$ = the concentration of radium emanation in the gas. When equilibrium is reached $\frac{E_2}{V_2}$ and $\frac{E_1}{V_1}$ will have definite values and at constant temperature and pressure, $$\frac{\frac{E_2}{V_2}}{\frac{E_1}{V_1}} = \frac{E_2 V_1}{E_1 V_2} = \alpha = \text{a constant}$$

This constant, $\alpha$, is called the coefficient of absorption of radium emanation by the liquid. Starting with a definite amount of radium emanation E, such that $E = E_1 + E_2$ and call $E = 1$, the following results since at room temperature $\alpha = 0.25$.

$$\frac{E_2 V_1}{E_1 V_2} = 0.25 \quad \text{(I)}$$

but $$E_1 = E - E_2$$

so, from (I)

$$E_2 = \frac{E V_2}{4 V_1 + V_2} \quad \text{(II)}$$

To obtain complete absorption of the radium emanation by the liquid, E (the total amount of radium emanation started with) must be made equal to $E_2$ (amount of the radium emanation absorbed) as shown by formula II. This can only be accomplished by making $V_1$ (volume of the gas) substantially negligible which cannot be accomplished with the apparatus previously described.

It is evident from the above, that if air is circulated through a radium solution, and this air is passed through the water to be activated, that whatever air is used, is going to take much of the radium emanation; and further, when the glass containing the water is disconnected from the apparatus for drinking the activated water, the surface of the water will be exposed to the atmosphere thereby making $V_1$ suddenly equal to infinity, the result being that the radium emanation in solution tends to escape into the atmosphere.

According to my invention, the water substantially completely absorbs all the radium emanation used. This is accomplished first, by using only purified radium emanation which has a very small volume, for example, about ½ c. mm.; second, by having a large amount of water pass through the compartment where the radium emanation is enclosed; and third, by preventing the activated solution containing radium emanation from coming in contact with the atmosphere. Since the fragile capillary tubes previously referred to may contain radium emanation in any desired concentration, it is seen that according to my invention, the use of radium itself is dispensed with. Broadly stated, my invention consists in a process of preparing for internal administration an activated fluid such as an aqueous solution comprising bringing the radium emanation into solution and then administering the same, both the solution step and the administering step occurring in the substantial absence of a diluting fluid, for example, air. Stated differently, my invention comprises a process of preparing for internal administration an activated fluid containing radium emanation comprising initially bringing the radium emanation into solution in the absence of a diluting fluid and then preserving the resulting activated fluid from substantial contact with other fluids until the activated fluid is administered. Further, my invention provides an apparatus for preparing activated fluids containing radium emanation for internal administration comprising a receptacle having a fluid such as, for example, water present therein to seal the receptacle from the atmosphere, a crushing mechanism in operative connection with said receptacle, a fragile seed in said crushing mechanism having present radium emanation capable of being liberated on crushing and going into solution in the fluid, an administering conduit adapted to receive the activated solution and means to positively administer the activated fluid and prevent the same from coming in contact with the atmosphere. As will be pointed out, in detail, this latter means may comprise a water head in combination with an activated piston or the equivalent thereof which may consist simply of a hydrostatic head as will be later described in connection with Figure 1. It is to be understood that the radium emanation may be dissolved in the fluid, either liquid or gases, but, at the present time, the most satisfactory carrying vehicle is a liquid such as water. Of course, liquids other than water may be used if desired.

In order that my invention may be clearly understood reference is made to the accompanying drawing wherein, Figure 1 is a side view partially in section showing the liquid receptacle, the crushing mechanism and the administering conduit all in operative connection.

Figure 2 is a longitudinal sectional view of the crusher mechanism.

Figure 2a is a horizontal central section through Figure 2.

Figure 3 is a transverse cross section of the crusher mechanism taken on line 3—3.

Figure 4 is a side view of the capillary tube before it is broken.

Figures 5 and 6 show a capillary tube broken in three pieces and illustrate the trapping of the emanation in the absence of crushing.

Figure 7 is a side view of a modified form of apparatus, wherein an activating piston is used.

Figure 8 shows a further modified form of apparatus, the liquid receptacle, the crushing mechanism and the administering conduit being self contained; and Figure 9 is a cross sectional view taken on line 9—9 of Figure 8.

The apparatus for preparing activated radium solution as shown in Fig. 1 comprises a receptacle 1, adapted to contain a liquid such as water 2, a crushing device or mechanism 3 in operative connection with the liquid receptacle 1 by means of conduit 4 and an administering conduit 5.

The crusher device comprises a body tube 6, an inlet member or tube 7 and an activated liquid outlet or tube 8. The screw 9 is in operative connection with crushing jaws hereafter to be mentioned in detail. The inlet tube 7 and the outlet tube 8 are provided with shoulders 10 and 11 abutting against the ends of the body tube 6 and held there tightly by caps 12 and 13 provided with bayonet slots 14, 15, 16 and 17 forming bayonet joints with pins 18, 19, 20 and 21. The structure set forth insures a liquid tight body connection between the inlet member or tube 7 and the body tube 6 and the outlet tube 8.

The inlet member 7 is provided with a passage way 22 leading to the crushing compartment 23. In outlet member 8 there is a passage way 24 also leading to the crushing chamber 23. At the end 27 of the inlet passage 22, there is integral therewith a lower stationary jaw 25 provided with teeth 26, the jaw 25, as shown in Fig. 2 covering a portion of the end 27 of the passage way 22. The remainder of the end portion 27 is covered by a screen 28 of approximately 300 mesh. At the end 29 of the outlet passage 24 there is a screen 30 of approximately 300 mesh.

The crushing screw 9 is provided with a projection 33 carrying a head 34 to which there is removedly secured an upper movable jaw 31 having teeth 32. The compartment formed by the screens 28 and 30 and the movable and stationary jaws 31 and 25 respectively may be termed the crushing compartment 23. Into this crushing compartment, an emanation seed such as shown in Fig. 4 may be charged by removing the cap 35 carrying the rod 35' from the tube 36 so as to enable the charging of a seed carrying radium emanation into the crushing compartment 23. It will be observed that the rod 35' substantially fills the tube passage way 37. This structure is provided to prevent water from entering the passage way 37 as when this occurs the radium emanation is occluded in the water and this is not desirable.

The operation of the crusher device is as follows: A seed containing radium emanation is inserted through the passage way 37 into the crushing compartment 23. Thereafter the cap 35 carrying the rod 35' is put on the tube 36 the rod 35' substantially completely filling the passage way 37. The cap 35 is tightly held to the tube 36 by means of the bayonet joint 38. The seed containing radium emanation as it enters the crushing compartment is positioned between the stationary jaw 25 and the movable jaw 31 which is activated by the screw member 9. Upon bringing the movable jaw 31 closer to the stationary jaw 25 the emanation seed is finely crushed liberating the radium emanation which is absorbed by the water filling the crushing chamber 23 whereby the water is activated.

It is to be noted that by crushing the capillary tubes containing radium emanation under water, the emanation is brought into intimate contact with the water. In this connection, it may be stated that crushing is absolutely necessary and that mere breaking will not suffice. The radium emanation in the capillary tube is under a pressure of one-half an atmosphere. If the tube 39 shown in Fig. 4 is broken into three pieces 40, 41 and 42 as shown in Figs. 5 and 6, the water rushes in in the direction of the arrows and as a result thereof, the emanation 43 is trapped by the water 44 and the solution is not properly activated. The crushing device set forth operates to finely crush the fragile seed such as a glass seed containing radium emanation and liberate the emanation without the formation of radium emanation pockets. The crushing operation is carried out under water and in a small compartment of approximate volume of one-quarter c. c. and the compartment is surrounded by fine screens 28 and 30 approximately 300 or 400 mesh. These screens function to prevent any pieces of crushed glass from passing through the passage way 24 and the administering conduit 5 or through the passage way 22 to the liquid receptacle 1. The shape of the crushing compartment 23 also tends to prevent the formation of pockets where the radium emanation may be occluded.

When the crushing compartment is in operative relation with the administering conduit and a liquid receptacle containing water, it is appropriate to allow a large volume of water between 100 and 200 c. c. per minute to flow in one direction through the crushing compartment 23 whereby the pieces of broken glass will be washed and the radium emanation repeatedly presented with fresh water and in this way the fresh water is made to pass constantly through and absorb the radium emanation present. This method of procedure approximates ideal extracting conditions and at the same time ideal means; since all the water comes in contact with substantially all of the broken pieces of glass.

The process as carried out in the apparatus shown prevents the charged water from coming in contact with the atmosphere and thereby eliminates the escape of the radium emanation into the atmosphere. This may be accomplished by employing any of the following:

(1) There may be a unidirectional flow of the water from the liquid receptacle into the crushing compartment 23 and then directly into the mouth piece.

(2) Instead of employing a unidirectional flow of water a circulatorial system may be provided, that is, a flow in two direction as will be noted from an examination of Fig. 7. This may be varied by providing a flow in two directions and having the water level protected with a layer of liquid lighter than water and immiscible with water. Various types of liquid immiscible with water may be used but light mineral oil is preferred.

(3) The crusher arrangement, the liquid receptacle, and the administering conduit may all be integral as shown in Fig. 8.

Referring to Fig. 1, it will be noted that the crusher device 3 is connected through the outlet 8 with the administering conduit 5 by means of the flexible tube 5ª which may be of rubber. The inlet conduit 7 is connected to the conduit 4, preferably made of rubber. The container 1 may be of any preferred size but, it is convenient to have the volume thereof approximately 200 c. c. When the crushing operation is carried out, the relative position of the liquid receptacle 1, the crusher 3 and the administering conduit 5 is as shown in Fig. 1, the water line being represented by the line a—a.

In operating a glass capillary tube such as tube 39 shown in Fig. 4 is charged into the crushing compartment 23 through the passage way 37. When this passage way has been closed by inserting the rod 35' and tightening the cap 35 the liquid receptacle 1 is filled with water, thus completely filling the conduit 4, the crushing compartment 23 of the crusher device 3, the outlet passage way or tube 8 and the administering conduit 5. It is noted that the level of the water in the liquid receptacle which will be the same as in the administering conduit 5. After the apparatus has been flooded with water as described, the glass tube which has been inserted into the crushing compartment 23 is crushed by operation of the screw member 9 and movable crusher jaw 21. After the crushing has taken place, the movable jaw 25 is separated from the stationary jaw 31. The mouth of a person is then applied to the administering conduit 5 and liquid container 1 is raised from six to twenty inches, thereby forcing the water in the liquid container or receptacle 1 through the crushing compartment 23 of the crusher device 3, the administering conduit 5 and thereby directly into the mouth of the person. Proceeding as set forth, the activated solution containing radium emanation impregnated therein is preserved from substantial contact with other fluids until the activated solution is administered.

The apparatus for preparing an activated liquid containing radium emanation and administering the same directly is preferably that shown in Fig. 1 because of the simplicity and efficiency of the apparatus. It is to be noted that after the glass capillary tube containing radium emanation has been crushed under water in the crushing compartment 23 of the crusher device 3 the radium emanation will tend to dissolve in the water surrounding it and thereby diffuse in all directions. Diffusion is desirable in the direction of the administering conduit 5, since in that direction the solution leads to the mouth of the person to be treated. Diffusion in the direction of the liquid receptacle 1 is not desirable since the water contained therein is open to the atmosphere. However, upon raising the liquid receptacle 1, the water flows from this receptacle into the crushing compartment 23 of the crusher device 3 at a greater speed than the speed of diffusion of the radium emanation solution in the opposite direction. In this manner, the radium emanation solution is never in contact with the atmosphere and therefore, the radium emanation does not escape.

Referring to Fig. 7, the liquid receptacle 45 is provided with a piston 46 fitting water tight and having an outlet conduit 47 provided with a stop cock 48. The crusher mechanism 3 is in operative connection by means of the inlet member 7 with the liquid container 45. The outlet member 8 of the crusher mechanism 3 is in operative connection with the administering conduit 49 which when solution is not being administered dips into the water 50 in the receptacle 51.

With the liquid receptacle 45 empty and the liquid receptacle 51 partly full of water, the capillary tube containing radium emanation is charged into the crusher device 3 with the jaws of the crusher device as far as possible, crushing occurring later. The piston 47 is then brought all the way down until it touches the bottom of the liquid receptacle 45 and thereafter the administering conduit 49 is introduced into liquid receptacle 51 which is more or less full of water. With the stop cock 48 closed, the piston 47 is raised slowly drawing water from the liquid receptacle 51 into the liquid container 45. The air originally contained in the crushing mechanism is drawn along with the water. The stop cock 48 is then opened and the piston 47 pushed down thereby forcing out all the air above the water level of the water 52 contained in liquid receptacle 45. The flow of water from the outlet 47 is an indication of absence of air in the cylindrical liquid receptacle 45. The stop cock 48 is then closed. At this stage of the operation, the crushing compartment 23 of the crusher device 3 is full of water and there is some water in the cylindrical liquid receptacle 45 with absolutely no air in the system. The fragile capillary tube containing the radium emanation is then crushed by bringing together the jaws of the crushing mechanism. These jaws are then immediately separated.

Thereafter the piston 46 is raised slowly until the cylindrical receptacle 45 is full of solution, the incoming fresh water having washed the broken pieces of glass and the radium emanation present. The administering tube 49 is then turned up and applied directly to the mouth of the person who wishes to drink the solution. The piston 46 is pressed down by means of the piston rod 53 thereby forcing the solution through the crushing compartment 23 and directly into the mouth of the person. In this manner the glass pieces are washed twice, once by fresh water and then by charged water.

Referring to Figure 8, 54 is a cylindrical liquid receptacle provided with a piston 55 having a piston rod 56, a piston forming a water tight connection with the liquid receptacle 54. The piston 55 carries an outlet administering tube 57 which is preferably made of glass. This administering conduit 57 carries a fine screen 58 approximating 300 mesh. The lower portion of the container 54 is provided with a crushing device comprising a stationary jaw 59 and a movable jaw 60 operated by the screw member 61. In operation, the piston 55 is entirely removed from the liquid receptacle 54, the crushing jaw 60 is separated from stationary jaw 59 by means of screw 61 and a glass tube containing radium emanation is placed between the crushing jaws 59 and 60 respectively. Thereafter, the screw 61 is turned until the fragile tube containing the radium emanation is held between the jaws 59 and 60 and is not broken thereby. The liquid receptacle 54 is then filled with water and piston 55 is placed into the receptacle 54 and pushed down until a portion of the water 62 shows into the mouth administering conduit 57. This indicates the absence of air from the liquid receptacle 54. Then, the emanation tube is crushed by advancing the movable jaw 60 as far as it will go. The movable jaw 60 is then withdrawn by means of the screw 61 and the radium emanation is thereby enabled to come in contact with the water. A person's mouth is applied directly through the administering conduit 57 and piston 55 is pushed by the piston rod 56 all the way in thereby forcing the activated liquid into the mouth of the person without allowing the activated liquid to come in contact with the atmosphere.

If desirable screens having approximately 400 mesh may be used instead of those having 300 mesh.

Radium emanation solutions and especially those prepared in the absence of diluting fluids may also be effectually administered by intravenous injection of the solution, and this may be accomplished by using a hypodermic needle instead of a mouth piece.

The crusher mechanism above described forms the subject matter of my co-pending application which has become Patent 1,614,825.

I claim:

1. The process of preparing for internal administration, an activated fluid carrying radium emanation comprising initially bringing the radium emanation into solution in the absence of a diluting fluid, and preserving the resulting activated solution from substantial contact with other fluids until the activated solution is administered.

2. The process of preparing for internal administration, an activated fluid carrying radium emanation comprising initially bringing the radium emanation into solution in the absence of a diluting fluid, and preserving the resulting activated solution from substantial contact with the atmosphere until the activated solution is administered.

3. The process of preparing for internal administration, an activated fluid carrying radium emanation comprising crushing a fragile seed containing radium emanation in the presence of the carrying vehicle, the crushing step being carried out in the substantial absence of a diluting fluid, and preserving the resulting activated fluid in the substantial absence of a diluting fluid until administered.

4. The process of preparing for internal administration, an activated fluid carrying radium emanation comprising crushing a fragile seed containing radium emanation in the presence of a carrying vehicle and in the substantial absence of a diluting fluid.

5. The process of preparing for internal administration, an activated fluid carrying radium emanation comprising crushing a fragile seed containing radium emanation in the presence of an aqueous carrying vehicle and in the substantial absence of air.

6. The process of preparing for internal administration, an activated solution carrying radium emanation comprising charging a fragile seed containing radium emanation into a crushing compartment which is in connection with a receptacle containing liquid, filling said crushing compartment with liquid drawn from said receptacle, allowing the liquid to pass into an administering conduit until the level of the water in the administering conduit is the same as that in the liquid receptacle, and then crushing the fragile seed to liberate the radium emanation and activate the liquid.

7. An activated liquid carrying radium emanation impregnated therein in which diluting fluids are substantially absent.

8. An activated liquid carrying radium emanation impregnated therein in which diluting gases are substantially absent.

9. An activated liquid carrying radium emanation impregnated therein in which air is substantially absent.

10. An activated aqueous solution carrying radium emanation impregnated therein in which air is substantially absent.

11. Apparatus for preparing activated fluids containing radium emanation for internal administration comprising a receptacle having a fluid present to seal the receptacle from the atmosphere, a crushing mechanism in operative connection with said receptacle, a fragile seed in said crushing mechanism having present radium emanation capable of being liberated on crushing, and going into solution in the fluid, an administering conduit adapted to receive the activated solution and means to positively administer the activated fluid and prevent the same from coming in contact with the atmosphere.

12. Apparatus for preparing activated fluids containing radium emanation for internal administration comprising a receptacle having a fluid present to seal the receptacle from the atmosphere, a crushing mechanism in operative connection with said receptacle, a fragile seed in said crushing mechanism having present radium emanation capable of being liberated on crushing, and going into solution in the fluid, an administering conduit adapted to receive the activated solution and a hydrostatic head to positively administer the activated fluid and prevent the same from coming in contact with the atmosphere.

13. In an apparatus for preparing activated fluids containing radium emanation, the combination in operative connection of means for crushing the seed containing radium emanation, and a receptacle adapted to contain a fluid capable of absorbing the liberated radium emanation.

In testimony whereof he hereunto affixes his signature.

ARMANDO CERVI.